United States Patent [19]

Katsuta

[11] Patent Number: 5,669,130
[45] Date of Patent: Sep. 23, 1997

[54] DEVICE FOR ASSEMBLING A SEAT BACK OF A SEAT

[75] Inventor: Kazuo Katsuta, Akishima, Japan

[73] Assignee: Tachi-S Co., Ltd., Tokyo, Japan

[21] Appl. No.: 542,163

[22] Filed: Oct. 12, 1995

[51] Int. Cl.⁶ .................................................. B68G 7/05
[52] U.S. Cl. .................... 29/91.5; 29/91.1; 29/448
[58] Field of Search .................... 29/91.5, 91.1, 29/91.7, 91.8, 448

[56] References Cited

U.S. PATENT DOCUMENTS

| | | | |
|---|---|---|---|
| 1,864,477 | 6/1932 | Stannard | 29/91.1 |
| 3,983,614 | 10/1976 | Koepke et al. | 29/91.5 |
| 4,675,962 | 6/1987 | Tillner et al. | 29/91.1 |
| 4,986,055 | 1/1991 | Mintz et al. | 29/91.1 |
| 5,168,615 | 12/1992 | Koa . | |
| 5,287,610 | 2/1994 | Gomolak et al. . | |
| 5,457,864 | 10/1995 | Sakaida | 29/91.5 |

FOREIGN PATENT DOCUMENTS

| | | |
|---|---|---|
| 04/158809 | 6/1992 | Japan . |
| 07/285274 | 10/1994 | Japan . |
| 07/16362 | 1/1995 | Japan . |
| 07/148364 | 6/1995 | Japan . |

*Primary Examiner*—S. Thomas Hughes
*Assistant Examiner*—Tisa L. Stewart
*Attorney, Agent, or Firm*—Browdy and Neimark

[57] ABSTRACT

A seat back assembling device designed for engaging two hook members of an incomplete seat back unit with each other to close the corresponding opened side thereof so as to form a complete seat back. In the device, all required operative mechanisms are collectively disposed to automatically assemble such incomplete seat back unit. Namely, the incomplete seat back unit is pressingly supported by a pressing mechanism, and the two hook members of the incomplete seat back unit are provisionally secured and brought to engagement with each other, by a positioning mechanism and a positioning/engaging mechanism. The hook members thus engaged together are subject to a further positive mutual engagement by way of a positive engagement mechanism. All those mechanisms are disposed as close as possible to a part of the device, such as a support base frame, without requiring other separate robot systems.

19 Claims, 6 Drawing Sheets

DEVICE FOR ASSEMBLING A SEAT BACK OF A SEAT

BACKGROUND OF INVENTION

1. Field of the Invention

The present invention relates to a device for assembling a seat back of a seat used in an automobile, and in particular to this kind of device applied to an incomplete unit of seat back comprising a foam cushion body and a sack-like covering member which has incompletely covered the foam cushion body, except for the lower side of the same, leaving thus an opened portion corresponding thereto. The device is designed to stretch and close such opened portion of covering member to thereby finish assembling the incomplete unit of seat back.

2. Description of Prior Art

In assembling a seat back forming a part of an automotive seat, a covering member of sack-like configuration has been employed for its readiness for substantially covering a whole of a foam cushion body. The so-called "sack-like" covering member is of a profile like a sack having one opened side, as designated at (12) in FIGS. 10 to 11, which is formed from a cloth or leather material into a three-dimensional seat back shape with its lower side opened only (at SB-L), thus defining a hollow therein to assume a sack-like appearance. In general, as in FIG. 10, a pair of arms (22)(24) associated with a reclining device are integral with the foam cushion body (P), wherein those two arms (22)(24) have been embedded together with a seat back frame within the cushion body (P) during a foaming process. The foam cushion body (P) thus formed is inserted into the hollow of the foregoing sack-like covering member (designated at (12) generally) to provide an incomplete unit of seat back, with first and second lower extensions (12e-1)(12e-2) of the covering member (12) being not connected together (see FIG. 11). As shown in FIG. 11, the first and second lower extensions (12e-1)(12e-2) are each sewn with first and second hook members (10)(11), respectively, for the purpose of connecting the two extensions (12e-1)(12e-2) together.

In the past, to finish such incomplete unit of seat back using the sack-like covering member, workers have connected, by their hands, those two extensions (12e-1)(12e-2) with each other via the two hook members (10)(11) or hog rings.

An improvement has been made to eliminate this manual process by providing a robot-based automated assembling system, as disclosed by the Japanese Laid-Open Patent Pub. No. 4-158809 for instance. It involves using one separate robot hand system and one separate pre-setting system, according to which an incomplete unit of seat back as stated above is preset in a predetermined state by a number of mechanisms of the presetting system and then the two extensions of covering member associated with the incomplete seat back unit are automatically connected together by operation of the robot hand system.

However, this sort of robot-based system is found defective in its extremely complicated mechanical structure and also in requiring a wide region for installation in the vicinity of a line of assemblage.

SUMMARY OF THE INVENTION

In view of the above-stated drawbacks, it is therefore a primary purpose of the present invention to provide an improved seat back assembling device which is simplified in structure and permits for automatically connecting together the first and second hook members of the foregoing incomplete unit of seat back to stretch their associated first and second extensions over the uncovered side of the foam cushion body, without requiring a separate robot system.

In order to achieve such purpose, the device, according to the invention, is basically comprised of:

- a receiving means for receiving and supporting the incomplete unit of seat back therein, the receiving means including a plate area on which one side of the incomplete unit of seat back rests;
- a pressing means for applying a pressure in a direction toward the receiving means so as to pressingly support the incomplete unit of seat back received in the receiving means, against the plate area thereof;
- a positioning means operable for provisionally securing the first hook member associated with the first extension of the covering member and lifting up the same to a predetermined first position;
- a positioning/engaging means operable for provisionally securing the second hook member associated with the second extension of the covering member, at a predetermined second position, and displacing the same therefrom in a direction towards the predetermined first position where the first hook member is secured to the positioning means, to thereby bring the second hook member to engagement with the first hook member to stretch the first and second extensions over said one side of the foam cushion body; and
- a positive engagement means defined integrally with the positioning/engaging means, the positive engagement means being for applying a pressure to the first and second hook members which have been engaged with each other by the positioning/engaging means, in order to make a positive engagement between the first and second hook members.

Accordingly, all the required operative elements are arranged in one system to permit automated assembling the foregoing incomplete unit of seat back, without need to equip any other separate robot system and complicated systems.

Preferably, the device may further include an auxiliary pressing means for applying an additional pressure to the incomplete unit of seat back received in the receiving member so as to reposition the first and second hook members which have been engaged together by the positioning/engaging means and compress a local part of the foam cushion body underlying the thus-mutually-engaged first and second hook members.

Preferably, a support base frame may be provided, on which all the receiving, pressing, positioning, positioning/engaging and positive engaging means are mounted, with such an arrangement that the receiving means is disposed at one lateral side of the support base frame, while the remaining pressing, positioning, positioning/engaging and positive engaging means are disposed inwardly of the support base frame and adjacent to the receiving means.

As one aspect of the present invention, the foregoing positioning/engaging means comprises a horizontal cylinder means operable to extend and withdraw a cylinder rod, on a horizontal line, between the predetermined second position associated with the positioning/engaging means and the predetermined first position associated with the positioning means and a movable engagement means to which the second hook member is to be provisionally engaged, which movable engagement means is so connected to said cylinder rod of the horizontal cylinder means as to be movable vertically relative thereto, with such an arrangement that the second hook member provisionally engaged with the movable engagement means may be displaced by operation of the horizontal cylinder means in a direction from the predetermined second position toward the predetermined first position, with the movable engagement means being caused to be rotated downwardly under a pulling force of the second extension of covering member to which the second hook member is provided, so that-the second hook member may be brought to engagement with the first hook member being set at the predetermined first position.

Any other specific various features and advantages of the present invention will become apparent from the reading of the descriptions hereinafter, with reference to the annexed drawings.

DETAILED DESCRIPTION OF PREFERRED EMBODIMENT OF THE INVENTION

As explained in the description of prior art above, a device to be described hereinafter in accordance with the present invention is directed to assembling an incomplete unit of seat back. This incomplete unit seat back is shown in FIGS. 3 to 6 under the designation (SB'), in which two lower extensions (12e-1)(12e-2) of a sack-like covering member (12) are not connected with each other. As understandable from FIGS. 10 to 12, what is described as incomplete unit of seat back (SB') comprises a foam cushion body (P) configured in a given automotive seat back shape, in which two reclining device lower arms (22)(24) are integrally provided as in FIG. 10, and a sack-like covering member (12) which substantially covers a whole of the cushion body (P), excepting the lower side (SB-L) thereof.

Figure 10:
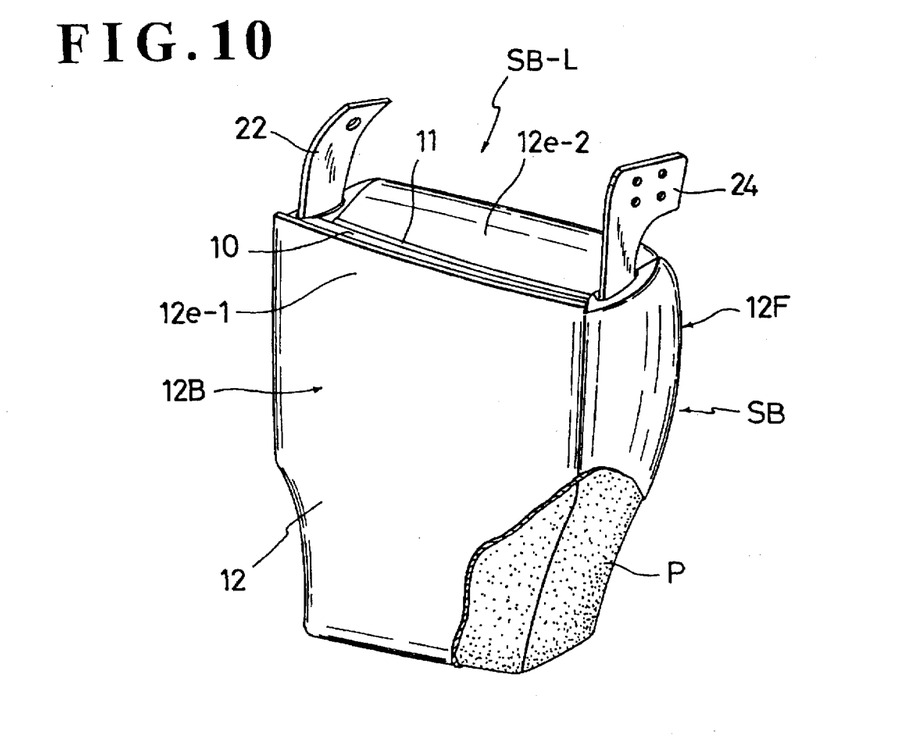
FIG. 10 is a partly broken perspective view of a resulting seat back assembled by the device in accordance with the present invention.
Figure 11:
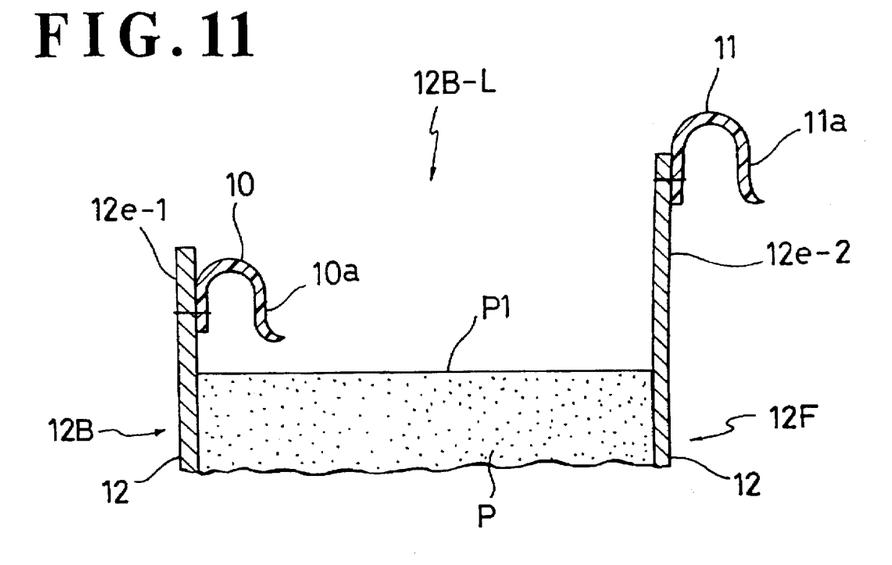
FIG. 11 is a schematic fragmentary sectional view of the incomplete unit of seat back to be assembled by the device in accordance with the present invention, showing the opened lower side thereof.

The covering member (12) has first and second lower extensions (12e-1)(12e-2), each extending continuously from the lower ends respectively of the forward side (12F) of covering member (12) and the backward side (12B) of same, as can be seen in FIGS. 10 and 11. Both first and second lower extensions (12e-1)(12e-2) project from the lower side (SB-L) of incomplete seat back unit (SB') as in FIG. 11, so that that particular lower side (SB-L) is in an opened state at this point.

Figure 12:
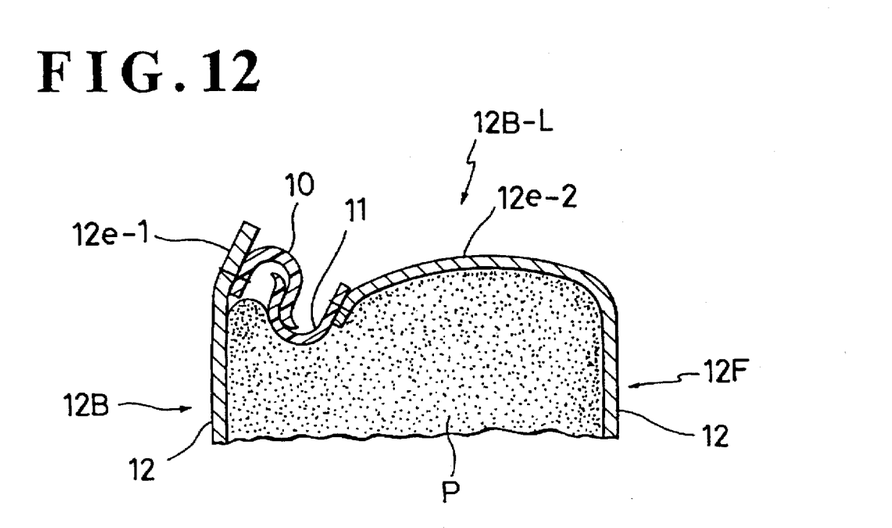
FIG. 12 is a schematic fragmentary sectional view of the resulting seat back as in the FIG. 10, showing a state where the first and second hook members are engaged with each other to close the lower side of the seat back.

Designations (10) and (11) respectively denote a first hook member and a second hook member, each being formed from a synthetic resin material in a lengthy shape having a length generally equal to the width each of the first and second lower extensions (12e-1)(12e-2) of covering member (12) and having a generally U-shaped cross-section, as shown in FIG. 11. Further, viewing the FIG. 11 in conjunction with FIG. 10, the first and second hook members (10)(11) are each sewn with the terminal ends respectively of those first and second lower extensions (12e-1) (12e-2) along the width-wise direction thereof. Specifically in this respect, as best shown in FIG. 11, the first hook member (10) is sewn to the inward surface of the first lower extension (12e-1), while the second hook member (11) is sewn to the outward surface of the second lower extension (12e-2), in order that the engagement end portion (11a) of second hook member (11) may be hookingly engaged with that (10a) of first hook member (10), as indicated in FIG. 12, which will be elaborated later.

Figure 3:
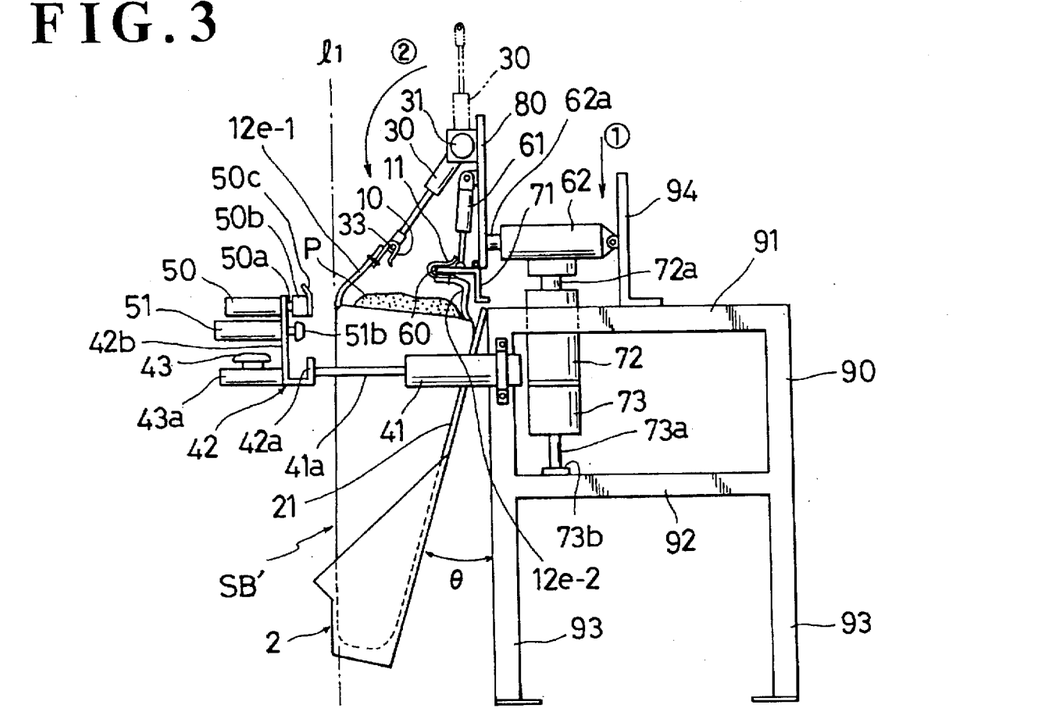
FIG. 3 is a side elevation view of the seat back assembling device, showing the state where an incomplete unit of seat back is placed therein, with its first and second hook members being provisionally secured thereto.

Particularly, as in FIGS. 3 and 11, in the incomplete seat back unit (SB'), those two extensions (12e-1)(12e-2) are in the state of being separate from each other, with their respective hook members (10)(11) being also disengaged from each other. It is to be understood that the designation (SB) in FIG. 10 represents a complete seat back to be assembled by the present invention, wherein the two lower extensions. (12e-1)(12e-2) are connected together and the two hook members (10)(11) are engaged with each other, as in FIG. 12.

Now, reference is made to FIGS. 3 through 9, in which is illustrated a seat back assembling device, as generally designated by (BS) in accordance with the present invention, which is designed to finish assembling the foregoing incomplete unit of seat back (SB') automatically.

Figure 1:
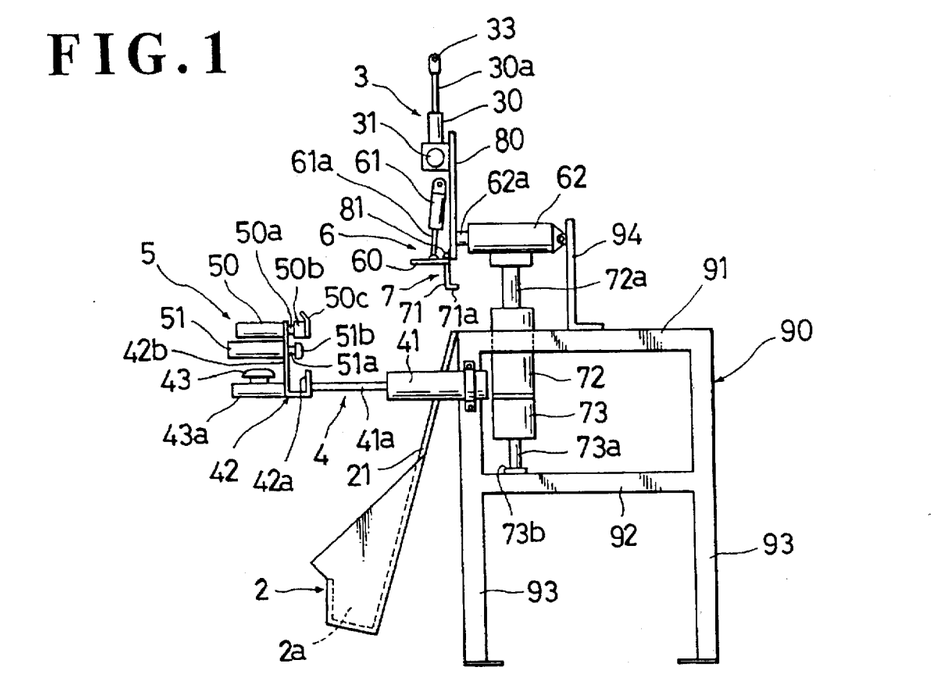
FIG. 1 is a side elevation view of a seat back assembling device in accordance with the present invention.
Figure 2:
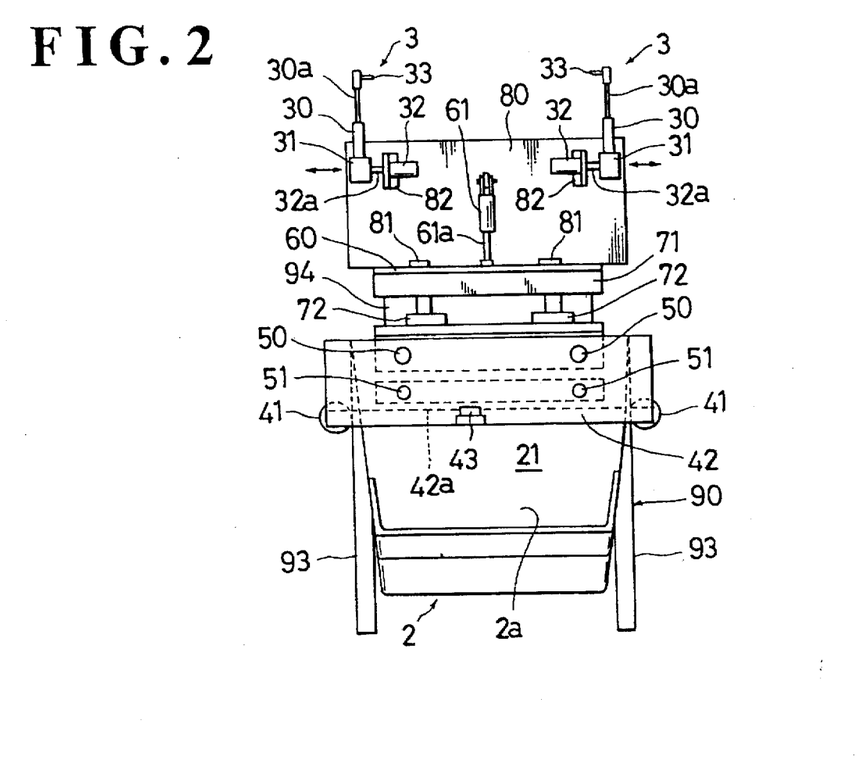
FIG. 2 is a front view of the same seat back assembling device in accordance with the present invention.

As shown in FIGS. 1 and 2, the device (BS) is basically comprised of: a seat back receiving member (2) in which the incomplete unit of seat back (SB') is received and supported; a positioning mechanism (3) for positioning the first lower extension (2e-1) of sack-like covering member (2), generally upright, at a given point; a positioning/engaging mechanism (6) for positioning the second lower extension (2e-2) of the covering member (2) with respect to that given positioning point of first extension (2e-1) and bringing the second hook member (11) sewn with the same second extension (2e-2) into a hooking engagement with the first hook member (10) sewn with the first extension (2e-1); a positive engagement mechanism (7) for making positive and deep the hooking engagement of second hook member (11)

with the first hook member (12); and a pressing mechanism (4) for pressing and securing the incomplete seat back unit (SB') against a flat plate area (21) of the seat back receiving member (2). Designation (5) denotes an auxiliary pressing mechanism (5) for applying an additional pressure to the opened lower side portion (at SB-L) of the incomplete seat back unit (SB') which is pressingly secured by the pressing mechanism (4) in the seat back receiving member (2).

All the above-mentioned constituent elements are fixedly mounted on a support base frame (90) which is disposed near a line of assemblage for automation as found in a factory (not shown). The support base frame (90), as understandable in FIGS. 1 and 2, is formed by a rectangular upper horizontal frame section (91), a pair of forward vertical frame sections (93), a pair of backward Vertical frame sections (93'), and a pair of intermediate horizontal frame sections (92), all in an integral fashion, through not shown clearly.

The seat back receiving member (2) is fixed at its upper end to the upper frame section (91) of support base frame (90), extending downwardly therefrom in a forwardly inclined state with respect to the forward vertical frame sections (93) of same frame (90). As best shown in FIG. 3, the receiving member (2) is formed with a flat plate area (21) and basket area (2a) so dimensioned to receive and support the incomplete seat back unit (SB') therein. It is noted here that in the present embodiment, the receiving member (2) assumes a certain forward inclination angle (θ) with respect to the forward vertical frame sections (93) in order to set the backward side (12B) of incomplete seat back unit (SB') in a vertical initial position line ($l_1$) in parallel with the vertical frame sections (93). This permits a precise positioning of such seat back unit (SB') for subsequent operations of the present device (BS). But, this is not limitative and the seat back receiving member (2) may be set along such vertical position line ($l_1$), or set at any other desired angle relative to the support base frame (90), depending on the outer shape of seat back unit (SB').

The pressing mechanism (4) is shown to be mounted on the upper part of the upper frame sections (93) of support base frame (9). The mechanism (4) includes a pair of main pressing cylinders (41) each being fixed to the two forward vertical frame sections (93), respectively, and situated at the upper end portions of the same (93). Each of the main pressing cylinders (41) has a cylinder rod (41a) projecting in a direction forwardly of the base frame (90) on a horizontal line as in FIG. 1. The mechanism (4) further includes a rectangular pressure plate (42) having an upturned pressure portion (42a) connected to the cylinder rods (41a) of cylinders (41). The pressure plate (42) also has a vertical body portion (42b), and, from the lower end of that vertical body portion (42b), the upturned pressure portion (42a) is formed continuously, at a side facing towards the support base frame (90). As shown in FIG. 2, the pressure plate (42) is disposed in front of the seat back receiving member (2), extending transversely of the upper end portion thereof, and so is the upturned pressure portion (42a) as indicated by the phantom line in FIG. 2.

Mounted fast to the outward surface of the vertical body portion (42b) of pressure plate (42) are the auxiliary pressing mechanism (5) which comprises a pair of upper auxiliary pressing cylinders (50) and a pair of lower auxiliary pressing cylinders (51), such that they are located heightwise of the pressure plate vertical body portion (42b) in this order. The two upper pressing cylinders (50) each has a cylinder rod (50a) passing through that vertical body portion (42b) and terminating in a free end projecting from the inward surface of same vertical body portion (42b), thus facing towards the upper end portion of the seat back receiving member (2). To those free ends of cylinder rods (50a), a laterally lengthy first pressing member (50b) is fixed, which thus extends transversely of the upper end portion of seat back receiving member (2) as indicated by the phantom line in FIG. 2. Designation (50c) denotes a laterally lengthy contact surface member fixed on the forward surface of the pressing member (50b) along the longitudinal direction thereof, the contact surface member (50c) being formed with a bent upper edge portion, as shown, to attain a good contact with the backward side (12B) of incomplete seat back unit (SB') while avoiding entanglement with the first lower extension (12e-1) associated with the same seat back unit (SB'). Similar to those upper auxiliary pressing cylinders (50), the two lower auxiliary pressing cylinders (51) are each provided with a cylinder rod (51a) which passes through the pressure plate body portion (42b), terminating in an free end projecting from the inward surface of same body portion (42b) to face towards the upper end portion of seat back receiving member (2). To those cylinder rods (51a), a laterally lengthy second pressing member (51b) is fixed, which has a cambered outer surface. As indicated by the phantom line in FIG. 2, the second pressing member (51b) extends transversely of the upper end portion of the seat back receiving member, in a length generally equal to that of the first pressing member (50b).

Preferably, the forward surface of the first pressing member (50) is initially positioned on the same vertical line with that of the upturned pressure portion (42a) of pressure plate (42), as seen in FIG. 1.

A mounting plate (80) is supported by a pair of horizontal cylinders (62) and a pair of combined vertical cylinders (72, 73), such as to be situated upright above the upper frame section (91) of base frame (90) and be disposed adjacent to the seat back receiving member (2). As shown, the mounting plate (80) is fixed at its backward surface to the respective cylinder rods (62a) of the two horizontal cylinders (62).

Figure 4:
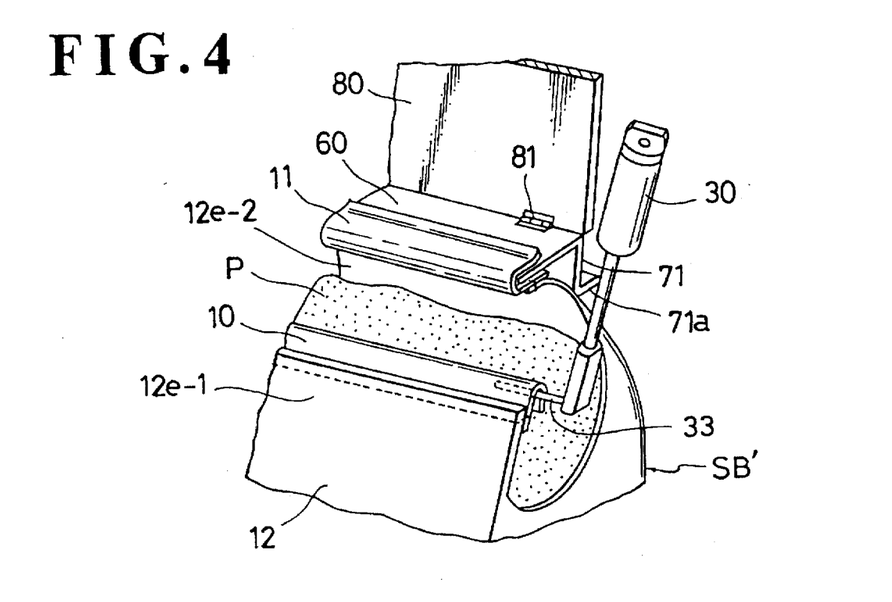
FIG. 4 is a fragmentary enlarged perspective view of the seat back assembling device as in the FIG. 3.

On the forward surface of that mounting plate (80), which faces towards the side where the pressing mechanism (4) lies, there is provided the positioning mechanism (3), which comprises a pair of spaced-apart horizontal cylinders (32), a pair of rotary cylinders (31), and a pair of lifting cylinders (30). The positioning mechanism (3) is shown to be situated at the upper area of the mounting plate (80). Specifically, the two horizontal cylinders (32) are each fixed on the mounting plate (80) by a bracket (82) and disposed symmetrically relative to a center of the same plate (80), as in FIG. 2, with their respective cylinder rods (32a) projecting in a direction opposite to each other. The rotary cylinders (31) are each connected to the respective cylinder rods (32a) of the horizontal cylinders (32). The lifting cylinders (30) are fixed to the rotary cylinders (31), respectively, extending at a right angle therefrom. Each of the lifting cylinders (30) has a cylinder rod (30a) whose free end is provided with an engagement pin (33) to be engaged in the first hook member (10) of incomplete seat back unit (SB'). Thus, as seen in FIGS. 2 and 4, it is important that the two engagement pins (33), which each projects at a right angle from the respective ends of lifting cylinder rods (30a) in a direction facing towards each other, should be initially positioned apart from each other at a distance slightly smaller than the width of the first hook member (10). However, by contrast, the two lifting cylinder rods (30a) be initially positioned apart from each other at a distance relatively greater than the width of first hook member (10). With this arrangement, operation of the two horizontal cylinders (32) causes all the rotary cylinders (31), lifting cylinders (30) and engagement pins (33) to be displaced in right and left directions along the width-wise direction of the mounting plate (80) as indicated by the arrows in FIG. 2. The rotary cylinders (31) are operable to rotate both lifting cylinders (30) and engagement pins (33) between an upright inoperative position and a forwardly inclined operative position. This can be understood from the two-dot chain and solid lines in FIG. 3. The lifting-cylinders (30) are operable to extend and withdraw their cylinder rods (30a) so as to move the engagement pins (33) along the longitudinal direction thereof, partly for the purpose of disengagement of those particular engagement pins (33) from the first hook member (10), as will be explained later.

The positioning/engaging mechanism (6) is provided on the same forward surface of the mounting plate (80) and situated at the lower area thereof, below the foregoing positioning mechanism (3). As shown in FIG. 1, the mechanism (6) consists essentially of: a rotatable engagement plate (60) with which the second hook member (11) is to be provisionally engaged (see FIG. 3); a biasing cylinder (61) for resiliently biasing and positioning the rotatable engagement plate (60) at a predetermined normal horizontal position as in FIG. 1; and the previously stated pair of horizontal cylinders (62) operable to move those engagement plate (60) and biasing cylinder (61) in a fore-and-aft direction with respect to the frame (90). According to that mechanism (6), specifically, the rotatable engagement plate (60) is hingedly connected at its one end to the lower end of the mounting plate (80) by means of two hinges (81), so that another free end of the plate (60) is free to rotate upwardly and downwardly relative to the hinges (81). As shown, the plate (60) is of a laterally lengthy type extending along the width-wise direction of the mounting plate (80) and having a length generally equal to that of the second hook member (11) of the incomplete seat back unit (SB'). Connected to this rotatable engagement plate (60) is the cylinder rod (61a) of the biasing cylinder (61) which is situated at the center of the mounting plate (80) and pivoted thereto. In a normal state, the rotatable engagement plate (60) is kept placed in a horizontally extending condition as typically shown in FIG. 1 under the resiliently biasing force of the cylinder (61). On the other hand, backwardly of the mounting plate (80), the two horizontal cylinders (62) are each supported fast upon the respective cylinder rods (72a) of vertical cylinders (72) and slidably supported by the vertical support member (94), as can be seen from FIGS. 1 and 2. Namely, each of the horizontal cylinders (62) is connected, at the cylinder rod (62a) thereof, to the backward surface of mounting plate (80), while being slidably fitted, at the backward bracket portion (62b) thereof, in a vertical groove (not shown) formed in the slide support member (94). Hence, operation of the vertical cylinders (72) will cause upward and downward movement of the horizontal cylinders (62) with respect to the base frame (90), which will in turn cause both biasing cylinder (61) and engagement plate (60) to be displaced in a direction away from and towards the seat back receiving member (2), together with the positioning mechanism (3).

The positive engagement mechanism (7) is defined integral with the foregoing positioning/engaging mechanism (6), according to the illustrated embodiment. That is, the constituent elements forming this positive engagement mechanism (7) are as follows: a pressing plate (71) of generally L-shaped cross-section integral with the rotatable engagement plate (60), and the previously stated pair of combined vertical cylinders (72, 73) which are also each integral with the foregoing two horizontal cylinders (62), respectively. The pressing plate (71) is formed from a laterally lengthy plate, with its free end portion being bent to form a pressing leg portion (71a). The whole length of such pressing plate (71) is equal to that of the rotatable engagement plate (60) as shown in FIG. 2. Another base end portion of the pressing plate (71) is integrally connected to the base end of that rotatable engagement plate (60) which is hinged to the mounting plate (80), so that the pressing plate (71) per se may be rotated about the hinges (81) through rotation of the engagement plate (60).

The pressing plate (71) is shown in FIG. 1 as extending at a right angle from the rotatable engagement plate (60), with the pressing leg portion (71a) of the former (71) projecting generally in parallel with the latter (60). Thus, in such normal state as in FIG. 1, the pressing plate (70) is so positioned as to extend vertically down towards the seat back receiving member (2), with the pressing leg portion (71a) thereof projecting horizontally in a generally parallel relation with the engagement plate (60) being set horizontal with respect to the mounting plate (80). As will be explained later, either or both of cylinders (72)(73) may be actuated to lower the vertically positioned pressing plate (71) towards the incomplete seat back unit (SB') set in the receiving member (2), for the purpose of making positive or deep the hooking engagement of the second hook member (11) with the first hook member (10).

With regard to the combined cylinders (72, 73), the lower cylinder portions (73) of them each has a downwardly extending cylinder rod (73a) which is mounted fast on a support plate (73b) fixed on the intermediate frame section (92) of base frame (90).

Designation (43) denotes a switch for starting or stopping the automated operations of the above-constructed seat back assembling device (BS). The switch (43) is connected via a bracket (43a) to the outward surface of body portion (42b) of the pressure plate (42).

It is noted that, although not shown, all the actuators in the device (BS) stated above, such as the cylinders (30, 31, 32, 41, 50, 51, . . . ), are electrically connected to a proper computerized control circuitry and associated electronic elements, to which, of course, the switch (43) is electrically connected, and that, to operate the switch (43) will cause those actuators to work in sequence according to a predetermined program stored in memory of computer. All the cylinders, excepting the biasing cylinder (61), may be electrically operated hydraulic cylinders or other suitable cylinders. The biasing cylinder (61) may be a simple hydraulic bumper-type cylinder or other suitable biasing-type cylinder.

Now, a specific description will be made of the actions and operations of the seat back assembling device (BS) constructed above, with reference to FIGS. 3 through 12.

At first, the incomplete seat back unit (SB') is turned upside down and manually set in the seat back receiving member (2), by inserting the top closed side of the former (SB') into the basket area (2a) of the latter (2), so that the lower opened side (at (SB-L) in FIG. 11) of the seat back unit (SB') is set at the upper end portion of the receiving member (2), as shown in FIG. 3, wherein the first and second lower extensions (12e-1)(12e-2) of covering member (12) project by themselves upwardly from that lower side (SB-L) of seat back unit (SB').

Secondly, the switch (43) is turned on, which results in actuating the upper cylinder portions (72) of combined vertical cylinders (72, 73) to lower their respective cylinder rods (72a) so as to move the mounting plate (80) down to a predetermined first level, as shown in FIG. 3, where the horizontally extending rotatable engagement plate (60) is positioned in the vicinity of the second covering member extension (12e-2) and its associated second hook member (11). Simultaneously therewith, the rotary cylinders (31) are actuated to rotate the lifting cylinders (30) from the upright inoperative position (indicated by the two-dot chain line) down to the forwardly inclined operative position (indicated by the solid line), where the two engagement pins (33) are positioned in the vicinity of the first covering member extension (12e-1) and its associated first hook member (10). At this stage, the two engagement pins (33) are spaced apart, in advance, from each other a distance slightly smaller than the width of both first extension (12e-1) and first hook member (10), by means of the cylinders (32). Also, the cylinder rods (30a) of lifting cylinders (30) are extended, in advance, to a point where the engagement pins (33) are accessible to the second hook member (11) for permitting the second hook member (11) to be readily engaged therewith.

Next, the second hook member (11) is provisionally engaged with the free end of the rotatable engagement plate (60), and then, the first hook member (10) is also provisionally engaged over the two spaced-apart engagement pins (33), as shown in FIGS. 3 and 4. These steps are, of course, effected manually by the hands of an operator.

Figure 5:
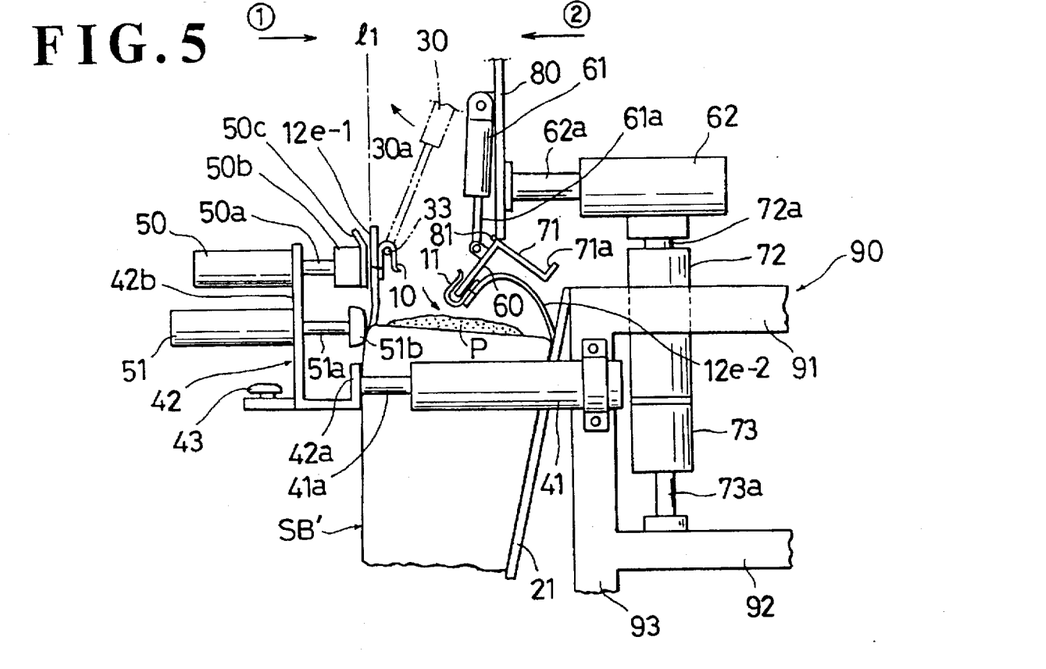
FIG. 5 is a fragmentary enlarged side view of the device as in the FIG. 3, showing explanatorily its operation for displacing the second hook member towards the first hook member.
Figure 6:
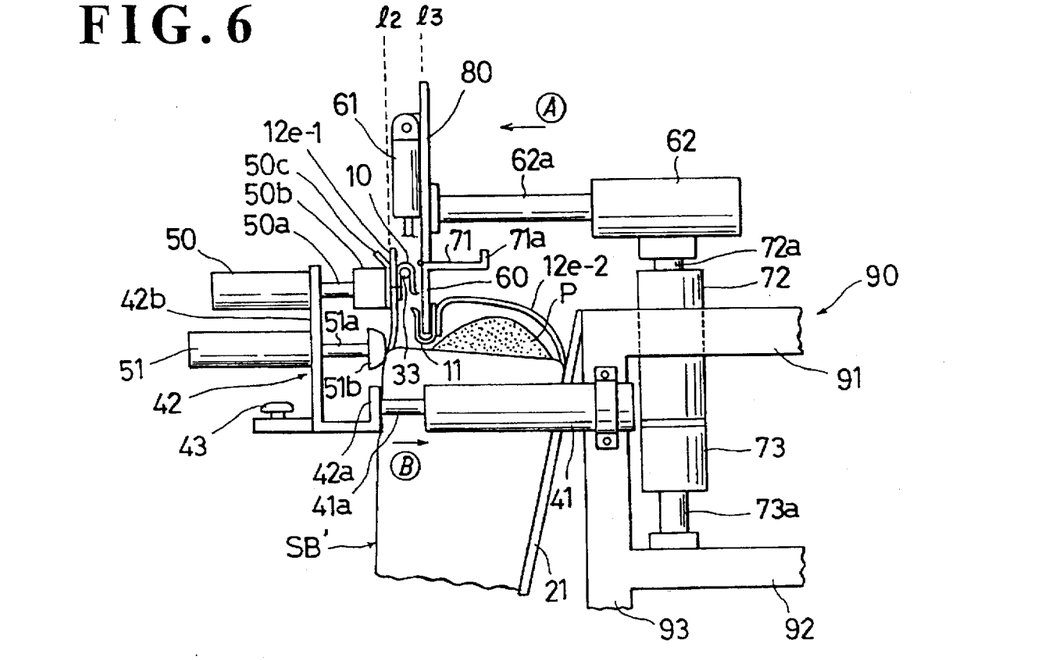
FIG. 6 is a fragmentary enlarged side view of the device as in the FIG. 3, showing explanatorily its operation for setting both first and second hook member in a state for mutual engagement thereof.

After then, by turning on the switch (43) once again, the two main pressing cylinders (41) are actuated to bring both pressure plate (42) and auxiliary pressing mechanism (5) towards an initial positioning point $(l_1)$, as indicated by the arrow ① in FIG. 5, so that the upturned pressure portion (42a) of pressure plate (42) contacts and slightly compresses the upper end portion of the inverted incomplete seat back unit (SB') which corresponds to the lower opened side (BS-L) thereof. At the same time, the rotary cylinders (31) are actuated to rotate the lifting cylinders (30) upwardly, a small amount, to abut the first covering member extension (12e-1) against the first pressing member (50b) or the contact surface member (50c) fixed thereto. Thus, as shown in FIG. 5, the first extension (12e-1) erects upright at the initial positioning point $(l_1)$, without undesired wrinkles and slacks therein, and the first hook member (10) is so vertically positioned as to orient its engagement pawl part (10a) (see FIG. 11) downwardly towards the exposed surface of cushion body (P). Further, at the same time, the horizontal cylinders (62) are actuated to displace the mounting plate (80), as indicated by the arrow ②, in the direction towards the thus-positioned first hook member (10), with the result that the rotatable engagement plate (60) is naturally caused to be rotated upwardly about the hinges (81) under the pulling force inherit in the elastic nature of the second covering lower extension (12e-2) which overcomes the biasing force of the biasing cylinder (30). Continuously, as shown in FIG. 6, the main pressing cylinders (41) are actuated on to move the upturned pressure portion (42a), as indicated by the arrow Ⓑ, to further press the incomplete seat back unit (SB') towards a compressed point at $(l_2)$, thus bringing the first hook member (10) to a given engagement position, while at the same time, the horizontal cylinder (62) is actuated on to further displace the mounting plate (80), as indicated by the arrow Ⓐ, to a predetermined point $(l_3)$ adjacent to that engagement position of first hook member (10). At this moment, as in FIG. 6, the rotatable engagement plate (60) is brought to abutment against the lower end of movable engagement plate (60), completing its rotation by 90 degrees and extending vertically in registry with the vertical longitudinal line of the same engagement plate (60). Thus, the second covering member extension (12e-2) is stretched, eliminating its wrinkles and slacks, whereas on the other hand, the second hook member (11) provisionally engaged with the rotatable engagement plate (60) is positioned below the first hook member (10), orienting its engagement pawl portion (at (11a) in FIG. 11) towards the same hook member (10).

During this process, it is seen that the first hook member (10), which is provisionally engaged on the engagement pins (33), is placed in a state where it generally assumes an inverted-U-shaped cross-section, while by contrast, with the downward rotation of the rotatable engagement plate (60), the second hook member (11) is turned over into a state where it generally assumes a U-shaped cross-section and set below such inverted-U-shaped cross-section state of first hook member (10), as observed in FIGS. 5 and 6.

It is noted here that a proper distance should be given between the aforementioned two positions $(l_2)(l_3)$ in order that the engagement pawl portions (10a)(11b) respectively of the first and second hook members (10)(11) are located in a mutually faced relation for ready engagement with each other, as can be seen in FIG. 6.

Then, the two engagement pins (33) are moved away from each other and released from the engagement with the second hook member (11) by operation of the two horizontal cylinders (32) which extend their cylinder rods (32a)(32a) outwardly to displace the two paired rotary and lifting cylinders (31)(30) from each other, as understandable from the arrows given in FIG. 2, after which, the rotary cylinders (31) are automatically actuated to rotate the lifting cylinders (30) upwardly toward the initial vertically extending position as in FIG. 2, whereupon the engagement pins (33) are also returned to their home positions above the mounting plate (80) as in FIGS. 1 and 2.

Figure 7:
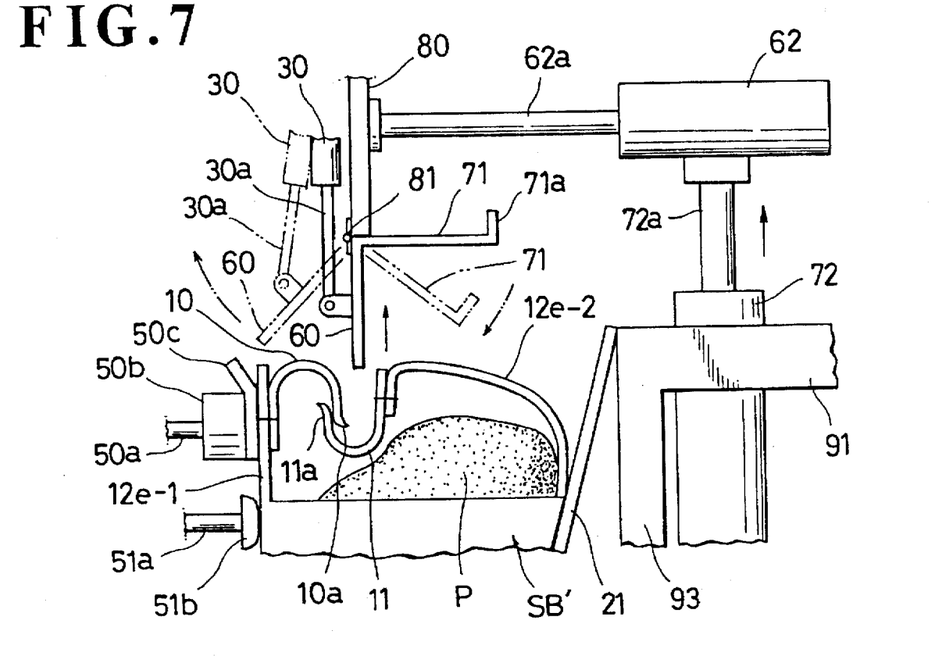
FIG. 7 is a fragmentary enlarged side view of the device as in the FIG. 3, showing explanatorily a process where the first and second members are engaged with each other and a positive engagement mechanism is being operated.

Thereafter, referring to FIG. 7, the upper cylinder portions (72) of the combined vertical cylinders (72, 73) are actuated to extend upwardly their respective cylinder rods (72a) to raise the mounting plate (80), thereby releasing the rotatable engagement plate (60) out of provisional engagement with the second hook member (11). During this operation, as the engagement plate (60) is raised by the cylinders (72), the second hook member (11) is also moved upwardly together therewith, with its pawl portion (11a) being brought to engagement with the pawl portion (10a) of first hook member (10), after which, the engagement plate (60) is released from the second hook member (11) and caused to be rotated upwardly about the hinges (81), as indicated by the two-dot chain line, under the pulling force of the biasing cylinder (61). Then, the engagement plate (60) is returned to the normal horizontally extending position, while the integral pressing plate (71) is also simultaneously returned to the normal vertically extending position.

At the present point, the engagement condition between the first hook member's pawl portion (10a) and second hook member's pawl portion (11a) is insufficient or incomplete, as understandable from FIG. 7.

Figure 8:
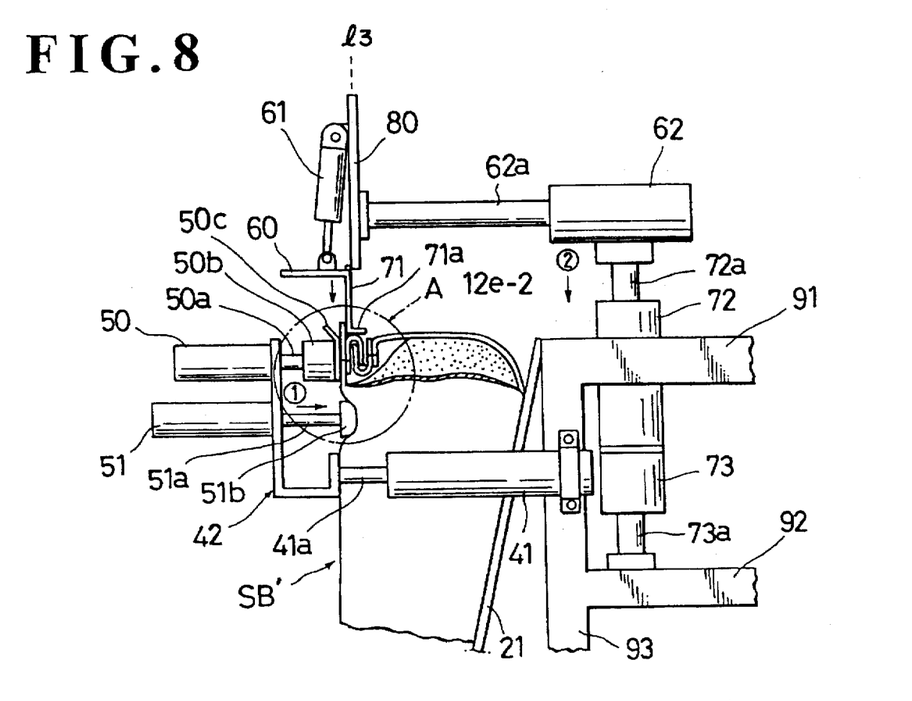
FIG. 8 is a fragmentary enlarged side view of the device as in the FIG. 8, showing explanatorily its operation for making positive the engagement between the first and second hook members.
Figure 9:
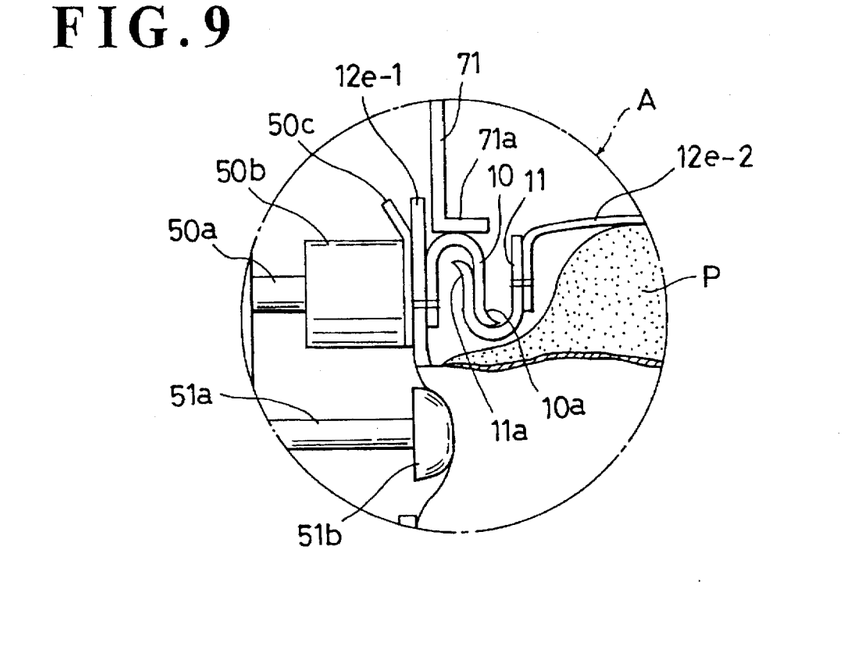
FIG. 9 is an enlarged view taken from a circle portion "A" in the FIG. 8.

Then, as indicated by the arrow ① in FIG. 8, the lower auxiliary cylinders (51) are actuated to move the second pressing member (51b) in a direction toward the frame (90), beyond the compressed point $(l_2)$ at which the first pressing member (50b) and upturned pressure portion (42) are aligned with each other at their respective vertical surfaces, thereby applying a further pressure to a local part of the incomplete seat back unit (SB') adjacent to the lower side (SB-L) thereof, as can be seen from FIGS. 8 and 9. This is advantageously effective in repositioning both first and second hook members (10)(11) to an optimal vertical engagement state, since they are being insufficiently engaged with each other as stated above and might be inclined, and further effective in compressing a part of the cushion body (P) corresponding to that local part of incomplete seat back unit (SB') to provide a firm base on which both first and second hook members (10)(11) rest stable against downward movement. Hence, in a subsequent positive engagement step described blow, the first and second hook members (10)(11) thus repositioned may be subject to a smooth further mutual engagement without failure.

After such preliminary conditioning step, the upper cylinder portions (72) of combined cylinders (72, 73) are again actuated to lower their respective cylinder rods (72a) to cause the vertically extending pressing plate (71) to move downwardly, as indicated by the arrow ② in FIG. 8, so that the pressing leg portion (71a) of that pressing plate (71) is brought to contact with the first hook member (10) and press the same downwardly into further engagement with the second hook member (11). Consequently, as best shown in FIG. 9, the respective pawl portions (10a)(11a) of first and second hook members (10) (11) are deeply engaged with each other, thereby making positive the mutual engagement between the first and second hook members (10)(11). In this connection, it is optional to actuate both upper and lower cylinder portions (72)(73) of the combined cylinders (72, 73) to lower their respective cylinder rods (72a)(73a) in order to bring the pressing leg portion (71a) toward the first hook member (10) for such positive engagement purpose. This will attain a double stroke in the cylinder actions, which shortens the time for the positive engagement between the first and second hook members (10)(11).

Accordingly, the incomplete seat back unit (SB') is assembled into a complete seat back (SB) in which the lower side (SB-L) thereof is closed by the interconnection between the first and second lower extensions (12e-1)(12e-2) of covering member (12), as seen in both FIGS. 10 and 12.

Finally, all the cylinders (41)(51)(62)(72,73) operated thus far are automatically returned to their respective initial home positions as in FIG. 1, and the foam cushion body (P) in the thus-assembled seat back (SB) is released from pressure, thus expanding outwardly to stretch the first and second covering member lower extensions (12e-1)(12e-2), which serves to make more firm the hooking engagement between the first and second hook members (10)(11), as understandable from FIG. 12. Then, the resulting seat back (SB) is taken out from the receiving member (2).

In accordance with the present invention, therefore, the seat back assembling device (BS) is much simplified in structure because of all the constituent elements being collectively arranged in a relatively small number of mechanisms, without requiring independent or separate robot hand system and seat back positioning systems. Moreover, the major workable mechanisms are disposed to adjacently surround the seat back receiving member (2): Namely, as seen from FIGS. 1, 2 and 3, the pressing mechanism (4) lies to adjacently surround the backward and both lateral sides of incomplete seat back unit (SB') to be received in the receiving member (2), whereas other mechanisms (3)(6)(7) lie in a vertical fashion, near to the forward side of the seat back unit (SB'), such as to extend along the vertical longitudinal direction of the same seat back unit (SB'). This means that all those mechanisms may be arranged as close as possible to an automation production line, and therefore do not require a large space for installation there.

While having described the present invention as above, it should be understood that the invention is not limited to the illustrated embodiments, but any other modifications, replacements and additions may be structurally applied thereto without departing from the scopes of the appended claims.

What is claimed is:

1. A device for assembling an incomplete seat back unit into a seat back of a seat, wherein the incomplete seat back unit comprises: a foam cushion body configured in a predetermined seat back shape; and a unitary three-dimensional covering member of a sack-like shape having one opened side and a pair of oppositely facing spaced-apart first and second extensions defined integrally in said one opened side, each being provided with a first hook member and a second hook member, respectively, and wherein said covering member incompletely covers said foam cushion body, with one side of the foam cushion body being uncovered by said pair of first and second extensions of said covering member, said device comprising:

a receiving means for receiving and supporting said incomplete seat back unit therein, said receiving means including a plate area on which one side of said incomplete unit of seat back rests;

a pressing means for applying a pressure in a direction toward said receiving means so as to pressingly support said incomplete seat back unit received in said receiving means, against said plate area thereof;

a positioning means operable for provisionally securing said first hook member associated with said first extension of said covering member and lifting up said first hook member to a predetermined first position;

a positioning/engaging means operable for provisionally securing said second hook member associated with said second extension of said covering member, at a predetermined second position, and displacing said second hook member therefrom in a direction towards said predetermined first position where said first hook member is secured to said positioning means, to thereby bring said second hook member into engagement with said first hook member to stretch said first and second extensions over said one side of said foam cushion body;

and a positive engagement means defined integrally with said positioning/engaging means, said positive engagement means being for applying a pressure to said first and second hook members which have been engaged with each other by said positioning/engaging means, in order to positively engage said first and second hook members.

2. The device according to claim 1, which further includes an auxiliary pressing means for applying an additional pressure to said incomplete seat back unit received in said receiving member so as to reposition said first and second hook members which have been engaged together by said positioning/engaging means and compress a local part of said foam cushion body underlying the thus-mutually-engaged first and second hook members.

3. The device according to claim 1, wherein there is provided a support base frame on which all said receiving, pressing, positioning, positioning/engaging and positive engaging means are mounted, with such an arrangement that said receiving means is disposed at one lateral side of said support base frame, while the remaining said pressing, positioning, positioning/engaging and positive engaging means are disposed inwardly of said support base frame and adjacent to said receiving means.

4. The device according to claim 1, wherein said pressing means comprises: a pressure plate disposed adjacent to another side of said incomplete seat back unit received in said receiving means; and a cylinder means disposed adjacent to said plate area of said receiving means, said cylinder means being connected to said pressure plate, and wherein operation of said cylinder means causes said pressure plate to press said another side of said incomplete seat back unit against said plate area of said receiving means.

5. The device according to claim 1, wherein said positioning means comprises: a pair of engagement means engageable with said first hook member from lateral sides; and a lifting means operatively connected to said pair of engagement means, said lifting means being operable to displace said pair of engagement means upwardly and downwardly with respect to said receiving means, such that both said first extension and first hook member may be lifted up to said predetermined first position by operation of said lifting means.

6. The device according to claim 5, wherein said lifting means comprises: a horizontal cylinder means operable to extend and withdraw a cylinder rod on a horizontal line in a direction transversely of said receiving means; a rotary cylinder means connected to said cylinder rod of said horizontal cylinder means; and a lifting cylinder connected to said rotary cylinder, wherein on said lifting cylinder, said pair of engagement means are provided such as to be spaced apart from each other, and wherein operating said horizontal, rotary and lifting cylinder means causes said pair of engagement means to be engaged with said first hook member from both lateral sides and then causes said first hook member as well as said first extension to be lifted up to said predetermined first position.

7. The device according to claim 1, wherein said positioning/engaging means comprises: a horizontal cylinder means operable to extend and withdraw a cylinder rod, on a horizontal line, between said predetermined second position associated with the positioning/engaging means and said predetermined first position associated with said positioning means; and a movable engagement means to which said second hook member is to be provisionally engaged, said movable engagement means being so connected to said cylinder rod of said horizontal cylinder means as to be movable vertically relative thereto, with such an arrangement that said second hook member provisionnally engaged with said movable engagement means may be displaced by operation of said horizontal cylinder means in a direction from said predetermined second position toward said predetermined first position, with said movable engagement means being caused to be rotated downwardly under a pulling force of said second extension of said covering member to which said second hook member is provided, so that said second hook member may be brought to engagement with said first hook member being set at said predetermined first position.

8. The device according to claim 7, wherein said movable engagement means of said positioning/engaging means comprises: a vertical mounting plate connected at one side thereof to said cylinder rod of said horizontal cylinder means, said vertical mounting plate extending vertically relative to said horizontal cylinder means; a rotatable engagement plate with which said second hook member is to be provisionally engaged, said rotatable engagement plate being rotatably connected via a hinge means to a lower end of said vertical mounting plate such as to be free to rotate vertically about said hinge means between a horizontal inoperative position where said rotatable plate extends horizontally from said mounting plate and a vertical operative position where said rotatable plate extends vertically along the longitudinal direction of said mounting plate, permitting said second hook member to be engaged with said first hook member; and a biasing means provided on another side of said vertical mounting plate, said biasing means being for normally biasing said rotatable engagement plate to said horizontal inoperative position in an elastic manner.

9. The device according to claim 8, wherein said positioning/engaging means further includes a vertical cylinder means connected to said horizontal cylinder means, said vertical cylinder means being operable to cause said horizontal cylinder means to move in a vertical direction, to thereby raise and lower said mounting plate in a direction wherein said second hook member may be engaged with said first hook member.

10. The device according to claim 1, wherein said positive engagement means comprises: a pressing plate provided integrally with said positioning/engaging means; and a cylinder means for raising and lowering said pressing plate so as to apply a pressure to said first and second hook members for the positive engagement therebetween.

11. The device according to claim 10, wherein said pressing plate is of a generally L-shaped cross-section.

12. The device according to claim 1, wherein said pressing means comprises: a pressure plate disposed adjacent to another side of said incomplete seat back unit received in said receiving means; and a cylinder means disposed adjacent to said plate area of said receiving means, said cylinder means being connected to said pressure plate, and wherein an auxiliary pressing means is provided at said pressure plate of said pressing means, said auxiliary pressing means being for applying an additional pressure to said incomplete seat back unit received in said receiving member so as to reposition said first and second hook members which have been engaged together by said positioning/engaging means and compressing a local part of said foam cushion body underlying the thus-mutually-engaged first and second hook members.

13. The device according to claim 12, wherein said auxiliary pressing means comprises a first auxiliary cylinder means having a part on which said first hook member rests, and a second auxiliary cylinder means operable to apply an additional pressure to said local part of said foam cushion body.

14. A device for assembling an incomplete seat back unit into a seat back of a seat, wherein the incomplete seat back unit comprises: a foam cushion body configured in a predetermined seat back shape; and a unitary three-dimensional covering member of a sack-like shape having one opened side and a pair of opposedly facing spaced-apart first and second extensions integrally defined in one opened side, each being provided with a first hook member and a second hook member, respectively, and wherein said covering member incompletely covers said foam cushion body, with one side of the same cushion body being uncovered by said pair of first and second extensions of said covering member, said device comprising:

a support base frame;

a receiving means disposed at one side of said support base frame in which said incomplete seat back unit is received and supported, said receiving means including a plate area on which one side of said incomplete unit of seat back rests;

a pressing means disposed laterally of said support base frame in the vicinity of said receiving means, said pressing means being for applying a pressure in a direction toward said receiving means so as to pressingly support said incomplete seat back unit received in said receiving means, against said plate area thereof;

a positioning means disposed at an upper side of said support base frame in vicinity of said receiving means, said positioning means being operable for provisionally securing said first hook member associated with said incomplete seat back unit received in said receiving means and lifting up said first hook member to a predetermined first position;

a positioning/engaging means disposed on a same plane with said positioning means at the upper side of said support base frame and in the vicinity of said receiving means, said positioning/engaging means being operable for provisionally securing said second hook member associated with said incomplete seat back unit received in said receiving means, at a predetermined second position, and displacing said second hook member therefrom in a direction toward said predetermined first position where said first hook member is secured to said positioning means, to thereby bring said second hook member into engagement with said first hook member to stretch said first and second extensions over said one side of said foam cushion body; and a positive engagement means defined integrally with said positioning/engaging means, said positive engagement means being for applying a pressure to said first and second hook members which have been engaged with each other by said positioning/engaging means, in order to positively engage said first and second hook members.

15. The device according to claim 14, wherein both said positioning and positioning/engaging means are provided on a same plane of a mounting plate disposed behind said plate area of said receiving means, and wherein said positioning/engaging means includes a cylinder means connected to said mounting plate, said cylinder means being operable to displace said mounting plate between said predetermined first and second positions.

16. The device according to claim 14, wherein said positive engagement means includes a cylinder means which is disposed inwardly of said support base frame and behind said plate area of said receiving means, said cylinder means being operable to displace the positive engagement means downwardly so as to make positive engagement between said first and second hook members.

17. A device for assembling an incomplete unit of seat back into a seat back of a seat, wherein the incomplete seat back unit comprises:

a foam cushion body configured in a predetermined seat back shaped; and a unitary three-dimensional covering member of a sack-like shape having one opened side and a pair of opposedly facing spaced-apart first and second extensions defined integrally in said one opened side, said pair of first and second extensions facing each other at their respective inward surfaces;

wherein respective outward surfaces of said first and second extensions extend continuously from an outward surface of said covering member;

wherein a first hook member of generally inverted-U-shaped cross-section is provided at said inward surface of said first extension and a second hook member of generally inverted-U-shaped cross-section is provided at said outward surface of said second extension, and wherein said covering member incompletely covers said foam cushion body, with one side of the same cushion body being uncovering by said pair of said first and second extensions of said covering member, said device comprising:

a receiving means for receiving and supporting said incomplete seat back unit therein, said receiving means including a plate area on which one side of said incomplete seat back unit rests;

a pressing means for applying a pressure in a direction toward said receiving means so as to pressingly support said incomplete seat back unit received in said receiving means, against said plate area thereof;

a positioning means operable for provisionally securing said first hook member, with said generally inverted-U-shaped cross-section of said first hook member maintained, and lifting up the same to a predetermined first position;

a positioning/engaging means operable for provisionally securing said second hook member, as it is provided on said outward surface of said second extension, at a predetermined second position, and displacing said second hook member therefrom, while turning over said second hook member into a state where it generally assumes a U-shaped cross-section, in a direction towards said predetermined first position where said first hook member is secured to said positioning means, with said generally inverted-U-shaped cross-section of said first hook member maintained, thereby bringing said second hook member into engagement with said first hook member, to stretch said first and second extensions over said one side of said foam cushion body;

and a positive engagement means defined integrally with said positioning/engaging means, said positive engagement means being for applying a pressure to said first and second hook members which have been engaged with each other by said positioning/engaging means, in order to make a positive engagement between said first and second hook members.

18. The device according to claim 17, wherein said positioning/engaging means comprises:

a horizontal cylinder means operable to extend and withdraw a cylinder rod, on a horizontal line, between said predetermined second position associated with the positioning/engaging means and said predetermined first position associated with said positioning means; and a movable engagement means to which said second hook member is to be provisionally engaged, said movable engagement means being so connected to said cylinder rod of said horizontal cylinder means as to be movable vertically relative thereto, with such an arrangement that said second hook member provisionally engaged with said movable engagement means may be displaced by operation of said horizontal cylinder means in a direction from said predetermined second position toward said predetermined first position, with said movable engagement means being caused to rotate downwardly under a pulling force of said second extension, so that said second hook member provided with said second extension may be turned over into the state where it generally assumes a U-shaped cross-section; and a vertical cylinder means connected to said horizontal cylinder means, said vertical cylinder means being operable to cause said horizontal cylinder means in a vertical direction so as to displace said movable engagement means in the likewise vertical direction, so that said second hook member assuming said U-shaped cross-section at said movable engagement means may be brought to a hooking engagement with said first hook member which is set at said predetermined first position, with its generally inverted-U-shaped cross-section maintained.

19. The device according to claim 18, wherein said movable engagement means comprises: a vertical mounting plate connected at one side thereof to said cylinder rod of said horizontal cylinder means, said vertical mounting plate extending vertically relative to said horizontal cylinder means; a rotatable engagement plate with which said second hook member is to be provisionally engaged, said rotatable engagement plate being rotatably connected via a hinge means to a lower end of said vertical mounting plate such as to be free to rotate vertically about said hinge means between a horizontal inoperative position where said rotatable plate extends horizontally from said mounting plate and a vertical operative position where said rotatable plate extends vertically along the longitudinal direction of said mounting plate, thereby permitting said second hook member, which assumes said generally U-shaped cross-section state, to be hookingly engaged said first hook member assuming said generally inverted-U-shaped cross-section state; and a biasing means provided on another side of said vertical mounting plate, said biasing means being for normally biasing said rotatable engagement plate to said horizontal inoperative position in an elastic manner.

* * * * *